May 23, 1961 V. R. POWELL 2,985,455
TUBE GRIPPING MECHANISM
Filed March 7, 1960 4 Sheets-Sheet 2

INVENTOR.
VERNON R. POWELL
BY
William C. Babcock
ATTORNEY

May 23, 1961 V. R. POWELL 2,985,455
TUBE GRIPPING MECHANISM
Filed March 7, 1960 4 Sheets-Sheet 3
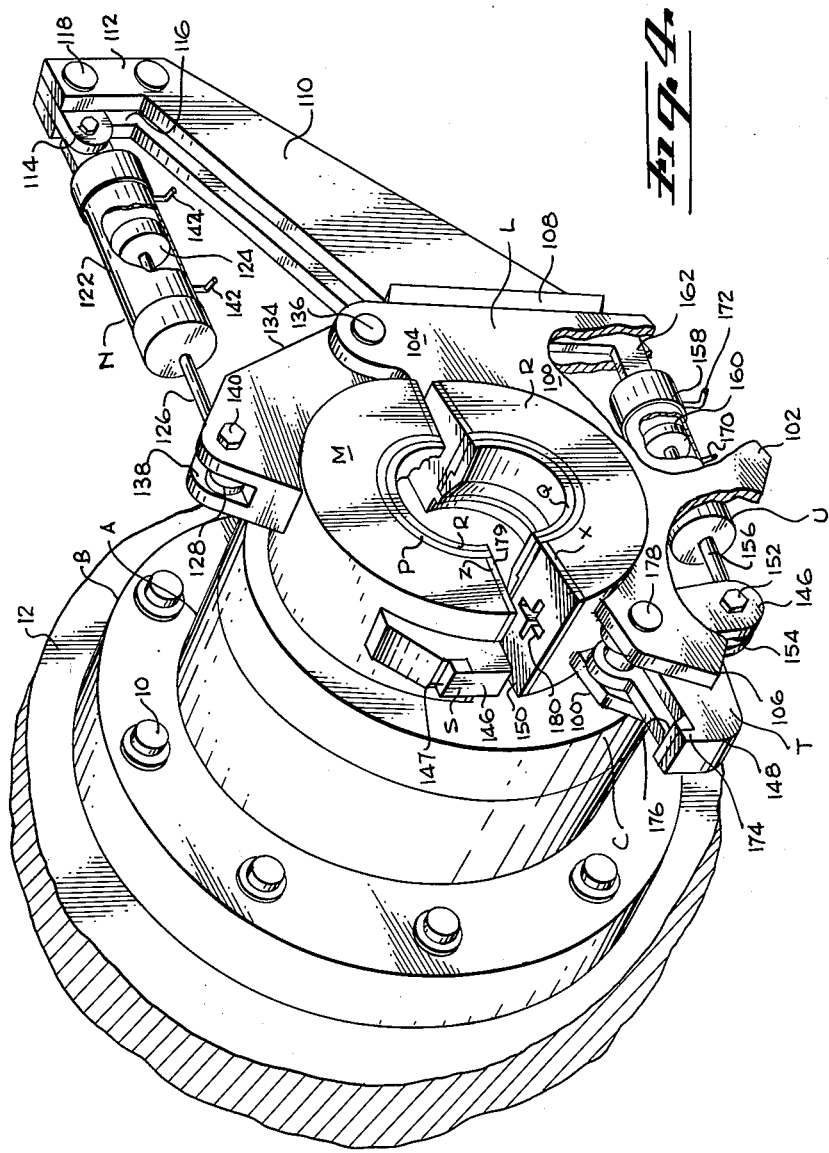
INVENTOR
VERNON R. POWELL
BY
William C. Babcock
ATTORNEY

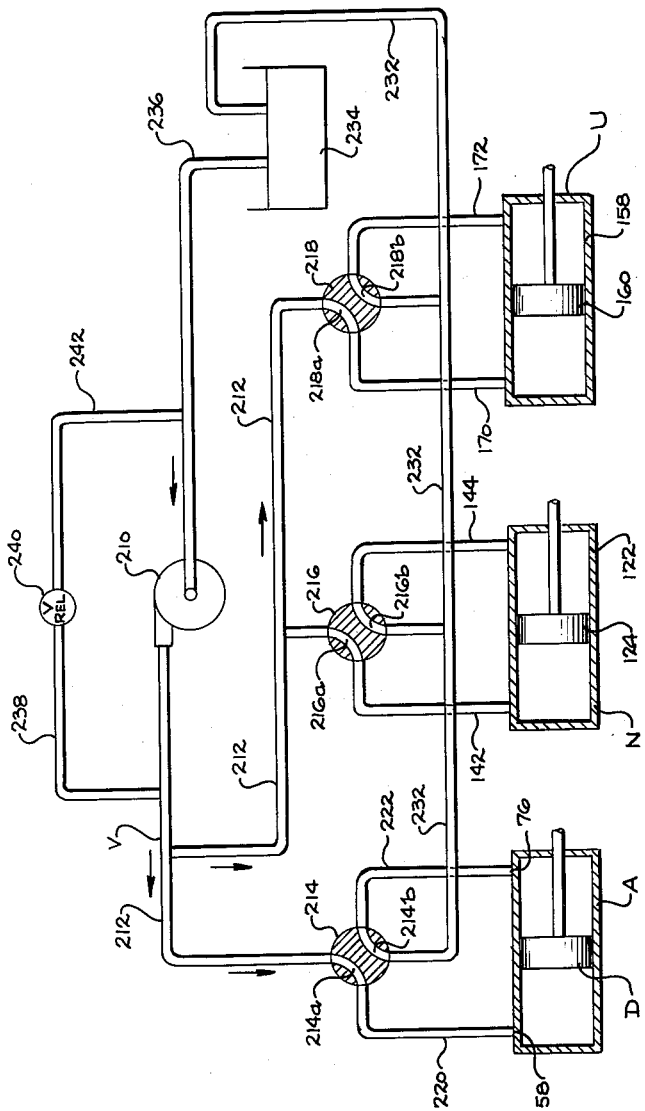

United States Patent Office 2,985,455
Patented May 23, 1961

2,985,455

TUBE GRIPPING MECHANISM

Vernon R. Powell, 35 59th Place, Long Beach 3, Calif.

Filed Mar. 7, 1960, Ser. No. 13,120

8 Claims. (Cl. 279—4)

The present invention relates generally to apparatus for use in the manufacture of tubular products, and more specifically to improved jaws for gripping the flared ends of tubing while work is being performed thereon.

The present invention is adapted to be used whenever it is desired to effect an exceedingly tight grip on the flared end of a tube, and has been found to be particularly useful in removably gripping the flared end of a tube in carrying out the methods disclosed and claimed in copending application Serial No. 512,061, filed in the United States Patent Office on May 31, 1955, entitled Apparatus and Method for Forming Close Tolerance Tubing and Articles Thereon, which issued as Patent No. 2,927,372 on March 8, 1960.

A primary object in devising the present invention is to provide a heavy duty hydraulically actuated gripping jaw for removably engaging the flared end of a tubular member, and one which is capable of remaining so engaged up to any desired maximum tensional load that may be placed on the engaged tubular member, which maximum load is determined by the pressure at which the hydraulic actuating fluid is supplied to the jaws, together with the maximum load the tubular member can withstand without failure.

Another object of the invention is to furnish gripping jaws, which due to the extremely high pressure that may be exerted thereby, permit the jaws to grip and hold a substantially shorter length of tapered end portion of a tubular member than has been possible heretofore.

Still another object of the invention is to provide a tube gripping assembly that is simple and easy to operate, positive in operation, requires a minimum of maintenance attention, and is economical to use in that there is a minimum of waste tubular materials due to the short length of the tapered ends gripped thereby.

A further object of the invention is to provide gripping jaws which are adapted to have an elongate mandrel extended therethrough into the confines of the tubular member that is being gripped by the jaws.

A still further object of the invention is to supply a tube gripping mechanism of such construction that the greater the pressure on the actuating hydraulic fluid, the greater will be the force exerted on the tapered end portion of the tubular member gripped thereby.

Yet another object of the invention is to furnish a tube gripping mechanism, which by means of a simple manual operation, may be adapted to grip the flared end of tubular members of various sizes within a predetermined range.

These and other objects and advantages of the invention will become apparent from the following description thereof, and from the accompanying drawings illustrating the same in which:

Figure 3 is a fragmentary, longitudinal cross-sectional view of the invention taken on line 3—3 of Figure 1;

Figure 4 is a perspective view of the invention; and

Figure 5 is a diagrammatic view of the hydraulic system used with the invention.

Figure 2:
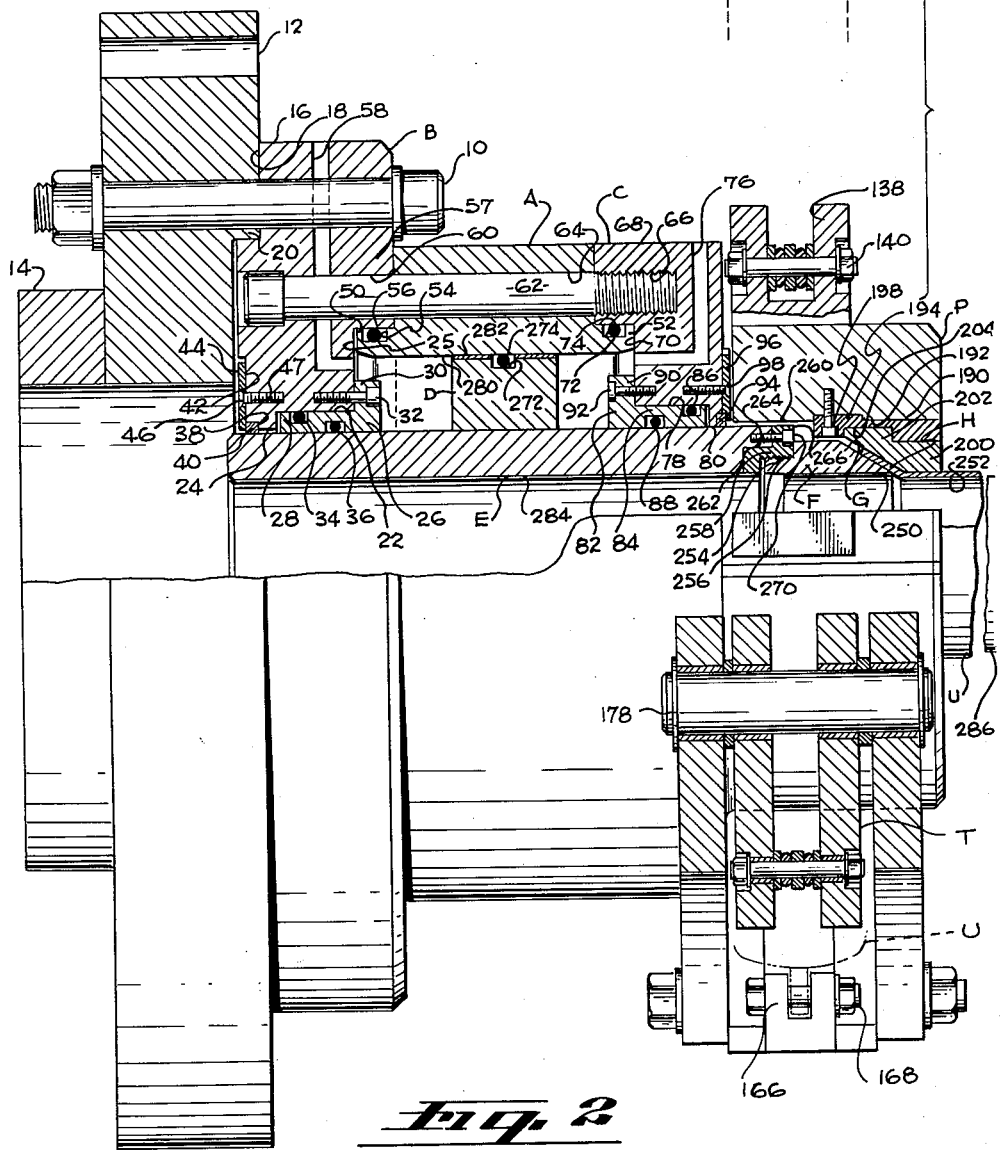
Figure 2 is a combined side elevational and longitudinal cross-sectional view of the invention taken on line 2—2 of Figure 1.

Referring to Figures 2 and 4 for the general arrangement of the invention, it will be seen to include a first hydraulic cylinder A, the rear end of which is closed by first flange means B, with the forward end being closed by second flange means C. A first piston D is slidably disposed within the confines of cylinder A and is rigidly affixed to a tubular plunger E that is slidably and sealingly mounted in openings formed in the first flange means B and second flange means C. Plunger E supports a punch F on the forward end thereof, which punch has a frusto-conical forward face G that is complementary to the interior surface of a flared end H of a tube J on which work is to be performed.

The invention, as best seen in Figure 4, includes a first semi-cylindrical jaw K that extends forwardly from flange means C. A frame L is affixed to the exterior surface of jaw K as well as to flange means C, with the frame L projecting outwardly on both sides of the first jaw. A second semi-cylindrical jaw M is pivotally supported from the frame L and is adapted to be moved to a position where it is in abutting contact with the first jaw, as shown in Figure 1.

Figure 1:
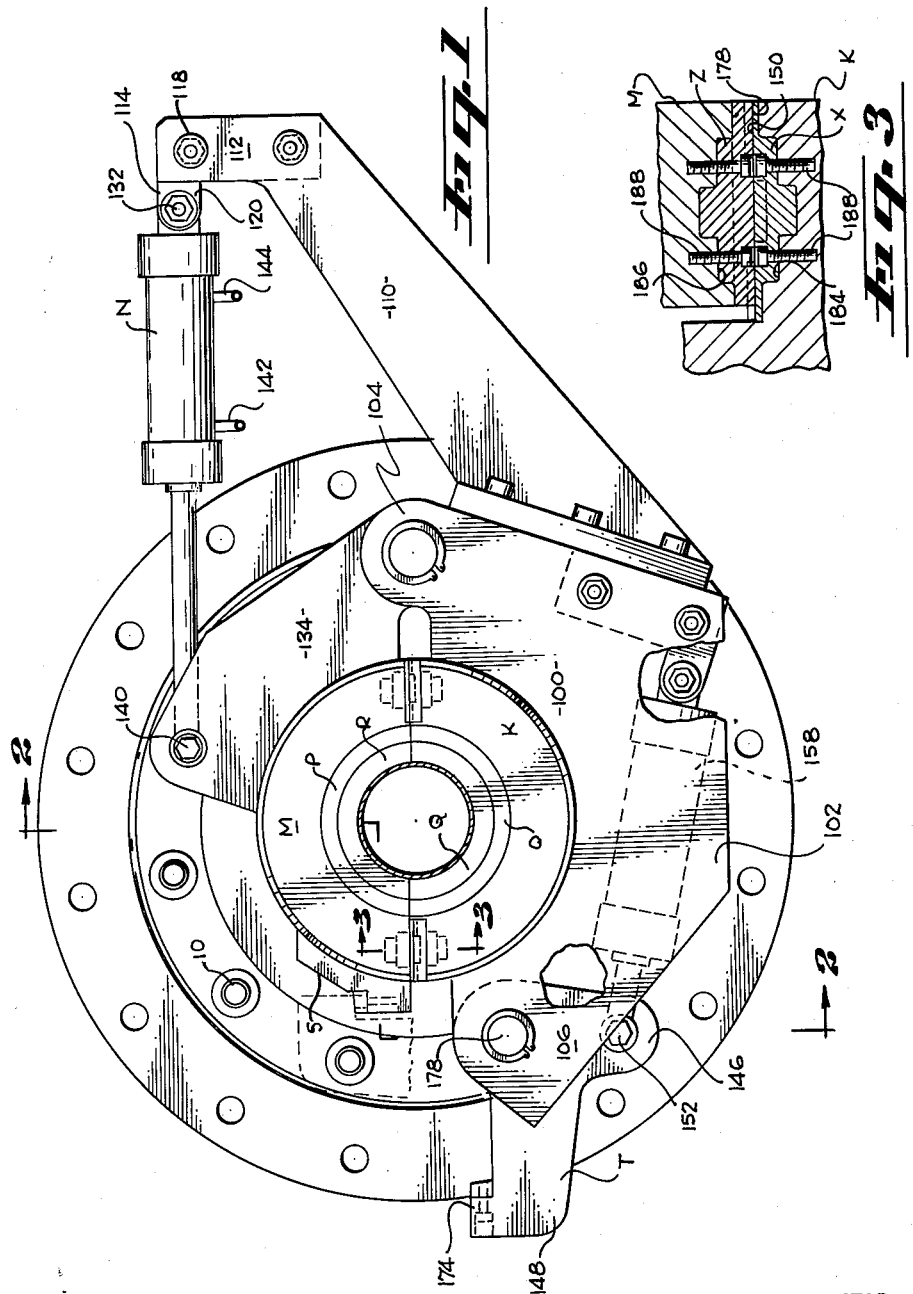
Figure 1 is a front elevational view of the invention.

First hydraulic means N shown in Figures 1 and 4, serve to pivot the second jaw M to a closed position relative to the first jaw K, or out of a closed position to permit the tube J on which work has been performed to be removed from the jaws. First and second semi-cylindrical die holders O and P, respectively, are removably supported in the first and second jaws K and M as shown in Figure 4. Die holders O and P serve to removably support identical semi-cylindrical first and second dies Q and R respectively, which have tapered interior surfaces as shown in Figure 2 that are complementary to the exterior surface of the flared end H of tube J and the adjacent exterior surface of the tube. When pressure is applied to the rear side of piston D, the plunger E and punch F are moved forwardly for the flared end H to be pressure-gripped between the dies Q and R and the tapered face G of the punch.

A first locking member S is rigidly affixed to the exterior surface of second jaw M and is adapted to be engaged by a second locking member T that is pivotally supported from the frame L. The position the second locking member T occupies when in a locking position is shown in phantom line in Figure 1. Second hydraulic means U are provided as shown in Figure 4, which when actuated pivots locking member T to either the first position shown in solid line in Figure 1, or to a second locking position shown in phantom line in the same figure.

The invention also includes the hydraulic system shown diagrammatically in Figure 5 which permits piston D to be moved forwardly to cause punch F to grip the flared end H of tube J between it and the dies Q and R, or to be moved rearwardly where punch F is not in a pressure-exerting position on the flared end H. The hydraulic system V also permits actuation of the first hydraulic means N to pivot the second jaw M to either a closed position with the first jaw K or to an open position relative to jaw K. The hydraulic system V also allows the second hydraulic means U to be actuated to cause the second locking member T to move from a first position to a second position where it is in engagement with the first locking member S as shown in phantom line in Figure 1.

With further reference to the drawings for the specific structure of the invention, it will be seen that the first flange means B are affixed by a number of bolts 10 to a flange 12, which flange is affixed to a portion 14 of the machine on which the invention is to be used. The first flange means B includes a circular flange 16 having a circumferentially extending recess 18 formed in the rear portion thereof that is engaged by a complementary raised forward portion 20 of flange 12. A centrally disposed, longitudinally extending bore 22 and coaxially aligned counter bore 24 are formed in flange 16. On the forward face of flange 16, bore 22 develops into a circular recess 25. A cylindrical sealing ring 26 is provided which includes a cylindrical body 28 that is disposed within the confines of bore 22. A circumferentially extending lip 30 projects from the forward end of ring 26, with the rear face of this lip abutting against the forward face of recess 25. A number of circumferentially spaced screws 32 project rearwardly through lip 30 to engage tapped bores formed in flange 16.

The exterior and interior surfaces of the cylindrical body 28 of sealing ring 26 have circumferentially extending grooves formed therein in which resilient O-rings 34 and 36 are seated to sealingly contact a portion of the surface of bore 22 and the exterior surface of plunger E respectively. The rear end of bore 24 terminates in a circumferentially extending recess 38 in which an O-ring 40 or other resilient member is disposed to sealingly engage the exterior surface of plunger E. A circumferentially extending recess 42 is formed in the rear face of flange 16 and is occupied by a sealing ring 44. Ring 44 is removably held on flange 16 by a number of circumferentially spaced screws 46 which project therethrough to engage tapped bores 47 formed in the flange (Figure 2).

The hydraulic cylinder A, as may be seen in Figure 2, is heavy-walled and cylindrical in shape, and two circular ribs 50 and 52 project from the ends thereof. Rib 50 is adapted to be slidably inserted within the confines of recess 25. A circumferentially extending groove 54 in which an O-ring 56 is disposed is formed on the exterior surface of rib 50. O-ring 56 sealingly engages a forwardly extending portion 57 of flange 16. An L-shaped passage 58 is formed in flange 16 to permit discharge of hydraulic fluid into or out of the confines of cylinder A. A number of circumferentially spaced, longitudinally extending bores 60 are formed in flange 16, through which bolts 62 project to pass through similar, aligned bores 64 formed in cylinder A to engage tapped bores 66 formed in a circular flange 68 forming a part of flange means C.

A circular recess 70 is formed in the rear face of flange 68 and is engaged by rib 52 on the hydraulic cylinder A. A circumferentially extending groove 72 is formed in rib 52 in which an O-ring 74 or other resilient sealing means is disposed to sealingly contact flange 68. Flange 68 has an L-shaped passage 76 formed therein through which hydraulic fluid may be discharged into or out of the confines of cylinder A. A central, longitudinally extending bore 78 is formed in flange 68 that communicates with recess 70, and the forward end of this bore develops into a counter bore 80. A sealing member 82 is provided which includes a cylindrical portion 84 that is slidably insertable within the confines of bore 78. Two longitudinally extending grooves are formed in portion 84 in which O-rings 86 and 88 are positioned to sealingly engage flange 68 and the exterior surface of plunger E, respectively.

The rear portion of sealing ring 82 develops into a rib 90 which abuts against the rear face of flange 68, and is held in place thereon by a number of screws 92 that project through the rib to engage tapped bores formed in flange 68. A circular sealing member 94 is mounted in a circumferentially extending recess formed in the forward portion of flange 68 and slidably and sealingly engages the exterior surface of plunger E. Sealing member 94 is held in place on flange 68 by a sealing ring 96. Ring 96 is in turn removably held on flange 68 by a number of circumferentially spaced screws 98 that project therethrough to engage tapped bores formed in the flange.

The frame L, as can best be seen in Figures 2 and 4, is preferably formed of two transversely disposed, longitudinally spaced heavy plates 100 of substantially identical configuration. The rearmost plate 100 is affixed to the forward exterior surface of the second flange means C, and the foremost plate 100 to the lower exterior surface of the first jaw K. Each of the plates 100 includes a central portion 102 from which an arm 104 projects upwardly and outwardly to the right, and an arm 106 which projects upwardly and outwardly to the left. The two arms 104 support a plate 108 that is bolted or otherwise affixed thereto. Two identical, spaced, rigid supports 110 extend outwardly from plate 108. The outer ends of supports 110 develop into upwardly projecting extensions 112. An L-shaped member 114 is provided, one leg 116 of which is disposed between the two extensions 112. Aligned bores extend through extensions 112 and leg 116 in which bolts 118 are inserted to hold the L-shaped member 114 and extensions 112 together as an integral unit. The member 114 also includes a leg 120 that extends toward the invention as shown in Figure 4. The leg 120 pivotally supports the first hydraulic means N.

The first hydraulic means N comprises a hydraulic cylinder 122 in which a piston 124 is disposed, which piston is connected to a piston rod 126 that slidably extends through the inwardly disposed end of the cylinder. The free end of piston rod 126 terminates in an eye 128. Cylinder 122 is pivotally supported from leg 120 by a bolt that projects through the leg and engages a bore formed in a lug 130 extending from the outermost end of the cylinder.

Second jaw M has a roughly triangular arm 134 extending outwardly and to the right thereof as seen in Figure 1. A bolt 136 projects through aligned bores formed in the frame arms 104 and in arm 134, and serves as a pivotal mounting for the second jaw M. A groove 138 is formed in the upper portion of arm 134, which groove is parallel to the rod 126. A bolt 140 extends through the upper portion of the arm 134 to pivotally engage eye 128 of piston rod 126 which is positioned within the confines of groove 138. Two conduits 142 and 144 are provided which communicate with the end portions of hydraulic cylinder 122. When fluid under pressure is discharged into the cylinder 122 through conduit 144, the piston 124 is moved outwardly with concurrent pivotal movement of arm 134 and second jaw M to place jaw M in an open position relative to first jaw K. Of course, when hydraulic fluid is discharged through conduit 144 into the hydraulic cylinder 122, with concurrent discharge of fluid from the cylinder through conduit 142, the arm 134 and second jaw M are pivoted in a counterclockwise direction as viewed in Figure 1, to place the first and second jaws in the closed position.

The first locking member S, as can best be seen in Figures 2 and 4, extends downwardly along the left-hand side of second jaw M, and includes an outwardly projecting portion 146 of heavy construction. Portion 146 has a flat surface 147 that is parallel to the face 150 of first jaw K when second jaw M is in the closed position relative thereto. The second locking member T (Figure 4) is generally L-shaped, having two legs 146 and 148. The leg 146 is bifurcated and defines a slot 150 therein. A bolt 152 extends through the bifurcated leg 146, with the portion of the bolt 152 in slot 150 pivotally engaging an eye 154 formed on the end of a piston rod 156 which projects through the end of a hydraulic cylinder 158 forming a part of the second hydraulic means U. The end of the piston rod 156 inside cylinder 158 is affixed to a piston 160 that is slidably movable therein. A lug 162 projects from the end of cylinder 158 opposite that from which piston rod 156 extends. A plate 164 is welded or otherwise affixed to the interior surfaces of the two frame plates 100 and extends therebetween. Two spaced rigid members 166 project upwardly from plate 164, between which members a bolt 168 extends. Lug 162 has a bore formed therein that pivotally engages bolt 168 to be pivotally supported therefrom.

Two conduits 170 and 172 are connected to the ends of cylinder 158. When fluid is discharged into the confines of cylinder 158 through conduit 172, the locking member T is pivoted in a clockwise direction to bring a detent 174 formed on the outer end portion of leg 148 into locking engagement with the portion 146 of first locking member S, as best seen in phantom line in Figure 1. The detent 174 has a smooth flat surface 176 that abuttingly contacts the surface 147 when the first and second locking members are in a locking position, and the first and second jaws K and M respectively are in the closed position. Locking member T is pivotally supported on a bolt 178 that extends through the frame arm 106 and through a bore extending through the locking member T, as can best be seen in Figure 2. The second locking member T, the bolt 178, and the first locking member S are of sufficiently heavy construction as to withstand, without damage, the greatest radial force that can be exerted on the first and second jaws K and M respectively by punch F, when the piston D is subjected to the highest hydraulic pressure that will be used on the system V.

First jaw K is provided with a registry member X, as best seen in Figure 4, that interlocks with a registry member Z on second jaw M when the first and second jaws are in a closed position. Interlocking of registry members X and Z which define face 150 on jaw K and face 179 on jaw M, prevents longitudinal movement of second jaw M relative to first jaw K when these jaws are subjected to a forwardly directed force by punch F. The registry member Z includes a cross-shaped protuberance (Figure 3) that is snugly and slidably received in a complementary cross-shaped recess 180 formed in registry member X. Due to the configuration of the cross-shaped protuberance and the complementary recess 180, the second jaw M is removably locked in registry with the first jaw K, both longitudinally and laterally. Registry members X and Z are at least partially in the form of inserts, which are disposed in complementary recesses 184 and 186 formed in first jaw K and second jaw M respectively, as best seen in Figure 3.

Registry members X and Z are removably held in cavities 184 and 186 in abutting contact with the first and second jaws K and M respectively, by a number of screws 188 projecting through registry members X and Z into tapped bores formed in the jaws. The die holders O and P are of identical cylindrical shape, and each holder includes a forwardly disposed semi-cylindrical surface 190 which engages a complementary groove 192 formed in jaw K and jaw M. Each of the die holders also includes a rearwardly disposed rib 194 that extends from the exterior surface thereof to engage a complementary groove 196 also formed in both the first and second jaws K and M. A number of screws 198 are provided which project through the rear portion of the die holders into tapped bores formed in both the first and second jaws K and M.

The dies Q and R are structurally identical, and each includes a forwardly disposed semi-circular portion 200 and a rearwardly disposed portion 202 that has an anterior face 204 which is complementary to the interior surface of the tapered end H of the tube J on which work is being performed. The rear semi-cylindrical portion 202 of each of the dies Q and R is adapted to slidably seat in a recess 204 formed in the die holder O or P in which the die is disposed. Die holders O and P and the dies Q and R can be removed from the invention by loosening the screws 198 to insert new dies and die holders in jaws K and M to permit the handling of a tubular member J of a different diameter.

The hydraulic system V used with the invention is diagrammatically illustrated in Figure 5 of the drawings. This system includes a pump 210 having a discharge line 212 which leads to three valves 214, 216 and 218. Conduits 220 and 222 connect valve 214 to passages 58 and 76 which communicate with the interior of hydraulic cylinder A. Valve 216 is connected by two conduits 142 and 144 to the opposite end portions of the interior of hydraulic cylinder 122. Valve 218 is connected by conduits 170 and 172 to the opposite end portions of the interior of hydraulic cylinder 158. Each valve 214, 216 and 218 is connected to a conduit 232 that extends to a reservoir 234.

A suction line 236 is provided for pump 210 that withdraws fluid as required from reservoir 234. To permit continuous operation of pump 210 when all of the valves 214, 216 and 218 are closed, the discharge line 212 is connected by a conduit 238 to a pressure relief valve 240, which valve in turn is connected by a conduit 242 to the suction line 236 of the pump. Valve 214 has two passages 214a and 214b formed therein. Likewise, two passages 216a and 216b are formed in valve 216. Valve 218 has passages 218a and 218b formed therein. When valve 214 is in the position shown in Figure 5, fluid is discharged from the line 212 through passage 214a, conduit 220 to passage 58 into the confines of cylinder A to move piston D and punch E to the right as shown in Figure 2, whereby punch F is advanced into pressure-contact with the flared end H. As piston D moves to the right, hydraulic fluid is discharged through the conduit 222, passage 214b into conduit 232 where it flows into reservoir 234.

By rotating the valve member 214 ninety degrees in a counterclockwise direction, the passage 214b is placed in a position to establish communication between the conduit 212 and conduit 222 and permit fluid from the pump to discharge into the right-hand side of the cylinder A to move the piston D therein to the left, thereby separating punch F from pressure contact with the flared end H. As piston D moves to the left, fluid on the left-hand side of the piston is discharged from conduit 220 through passage 214a to conduit 232 for return to the reservoir 234.

When valve 216 is in the position shown in Figure 5, hydraulic fluid is discharged from the line 212 through passage 216a to conduit 142 to force the piston 124 outwardly in hydraulic cylinder 122, with concurrent pivotal movement of the second jaw M in a clockwise direction as shown in Figure 4. Counterclockwise rotation of the valve 216 ninety degrees as shown in Figure 5 causes the passage 216a to establish communication between line 142 and the conduit 232 extending to reservoir 234. With the valve 216 having established communication between line 212 and conduit 144 through passage 216b, which passage permits the flow of fluid under pressure from the pump into the outermost portion of the cylinder 122, the piston rod 126 is moved to pivot the second jaw M in a counterclockwise direction to a closed position relative to the first jaw K.

When valve 218 is in the position shown in Figure 5 it establishes communication between the pump discharge line 212 and conduit 170 to admit fluid into the left-hand side of cylinder 158, as shown in Figure 4. This fluid under pressure moves the piston 160 to the right, with concurrent pivotal movement of the second locking member T from the position shown in phantom line in Figure 1 to the position shown in solid line in that figure as well as in Figure 4. Rotation of the valve 218 ninety degrees in a counterclockwise direction establishes communication between the line 212 and conduit 172 to permit fluid to flow into the hydraulic cylinder 158 on the right-hand side of the piston 160 as shown. Concurrently, passage 218a in valve member 218 establishes communication between the conduit 170 and conduit 232 in reservoir 234. As piston 160 moves to the left, fluid is discharged from the left-hand side of the piston in cylinder 158 through conduit 170 into the conduit 232.

If desired, automatic means may be provided to sequentially rotate the valves 214, 216 and 218 to effect automatic closing of the second jaw M on first jaw K, the movement of the second locking member T to a position where it interlocks with the first locking member S, and thereafter, rotation of valve member 214 to a position where fluid under pressure is introduced into the left-hand portion of cylinder A (Figure 2) to cause the piston D, plunger E and punch F to move to the right to pressure-contact and grip the flared end H between the dies Q and R and the forwardly tapered face G of the punch. Of course, valves 214, 216 and 218 can be moved to sequentially reverse the previously described mode of operation when it is desired to remove the flared end H from within the confines of jaws K and M.

The punch F, as can best be seen in Figure 2, is of tubular construction and has a longitudinally extending bore 250 formed therein which is slightly larger in diameter than the internal bore 252 of the tube J on which work is being performed. The rear portion of punch F defines a tubular boss 254 having threads 256 formed thereon that engage a tapped bore 258 defined in a punch-supporting ring 260. Ring 260 has a cylindrical body 262 that snugly seats in a recess 264 formed in the forward end portion of plunger E. The ring 260 also includes a forwardly disposed circular rib 266 that abuts against the forward face of plunger E. The punch-supporting ring 260 is removably affixed to the forward portion of plunger E by a number of circumferentially spaced screws 270 which project through rib 266 to engage tapped bores extending rearwardly in the plunger E.

The piston D preferably has a circumferentially extending groove 272 formed therein in which an O-ring 274 or other sealing member is positioned that slidably and sealingly contacts the interior surface 280 of hydraulic cylinder A. Two circumferentially extending bands fabricated from copper, bronze, or the like, are provided on piston D as shown in Figure 2, which are adapted to slidably and sealingly contact the interior surface 280 of cylinder A with a minimum of friction. The internal diameter of a bore 284 extending longitudinally through plunger E and bore 250 in punch F are larger than the internal diameter 252 of the tube J, whereby it is possible during working of tube J to not only slidably insert a mandrel 286 which may be of either solid or tubular construction, through tube J, but pass it through the bores 250 and 284 as well.

Operation of the present invention is relatively simple. A flared end H is formed on tube J by conventional means. By use of the first hydraulic means N, the second jaw M is pivoted to an open position, and the flared end H is then placed within the confines of the first and second jaws, resting on the first die Q. The valve 216 is rotated to a position to permit discharge of hydraulic fluid into the cylinder 122 through conduit 144, and concurrent discharge of fluid from the cylinder through the conduit 142 to be returned to reservoir 234 through conduit 232. The second jaw M is pivoted counterclockwise to the position shown in Figure 1.

Hydraulic fluid under pressure from pump 210 is then discharged through conduit 172 into the hydraulic cylinder 158 to cause the piston 160 therein to move to the left, as seen in Figure 4, and clockwise rotation of the second locking member T until the detent 174 thereof is in engagement with the first locking member S. Valve 214 is then disposed to permit fluid under pressure from pump 210 to flow through conduit 220 to passage 58 where it enters the left-hand side of cylinder A, and moves piston D to the right as shown in Figure 2, with concurrent movement to the right of the plunger E and punch F. Punch F is moved into pressure contact with flared end H, and frictionally grips the same between the frusto-conical face G on the punch and complementary tapered faces defined by the first and second dies Q and R. The tube J is gripped in this manner during the time work is being performed thereon, and as mentioned hereinabove, the mandrel 286 can be moved in and out of the invention without in any way disturbing the gripping action of the invention on the flared end H. After the work has been completed, the above described cycle of steps is merely reversed, and the tube J is then free to be removed from the invention and another tube J substituted in its stead.

It will be obvious to those skilled in the art that various changes may be made in the invention without departing from the spirit and scope thereof, and therefore the invention is not limited by that which is shown in the drawings and described in the specification, but only as defined in the appended claims.

I claim:

1. A tube gripping mechanism for removably gripping a flared end of a tubular member, including: a first hydraulic cylinder having forward and rear ends; first flange means that close the rear end of said cylinder; a first piston slidably mounted in said cylinder; second flange means that close the forward end of said cylinder; a tubular plunger affixed to said piston and slidably and sealingly mounted in longitudinally aligned first and second bores formed in said first and second flange means respectfully; a punch mounted on the forward end of said plunger, said punch having a frusto-conical forward face which is complementary to the interior surface of said flared end; a first semi-cylindrical jaw that extends forwardly from said second flange means; a frame rigidly affixed to said first jaw; a second semi-cylindrical jaw pivotally supported on said frame; first hydraulic means for pivoting said second jaw to a closed position and out of a closed position with said first jaw; first and second semi-cylindrical die holders removably supported in said first and second jaws; first and second semi-cylindrical dies positioned in longitudinally extending grooves formed in the faces of said die holders which are in juxtaposition when said second jaw is pivoted to a closed position with said first jaw, with each of said dies defining one-half of a second frusto-conical surface that is complementary to the exterior surface of said flared end; a first locking member rigidly affixed to said second jaw; a second locking member pivotally supported from said frame; second hydraulic means for pivoting said second locking member between a position where said second locking member is not in engagement with said first locking member and a position where it is in engagement with said first locking member; and a hydraulic system including conduit means connectable to a source of hydraulic fluid under pressure and to a reservoir as well as being connected to said cylinder and first and second hydraulic means, said system also including first, second and third valves connected to said conduit means, each of said valves capable of being disposed in first and second positions, said first valve when in said first position permitting said fluid to flow from said source to move said piston in said cylinder in a direction for said punch to move into pressure contact with said flared end when it is in said dies, said first valve when in a second position permitting fluid from said source to move said piston and punch away from said dies, said second valve when in said first position permitting fluid to flow from said source to actuate said first means to close said second jaw on said first jaw and when in said second position to actuate said first means to pivot said second jaw away from said first jaw, with said third valve when in said first position permitting fluid to flow from said source to actuate said second hydraulic means to pivot said first locking member from said position where it is not in engagement with said locking member to a position where it is in engagement with said locking member and when in a second position pivoting said first locking member to said position out of engagement with said first locking member.

2. A tube gripping mechanism as defined by claim 1 wherein said frame extends substantially around said first jaw and is transversely disposed relative thereto, said frame having first and second portions disposed on opposite sides of said first jaw, with said second jaw being pivotally supported from said first portion, and said second locking member from said second portion.

3. A tube gripping mechanism as defined by claim 2 wherein a supporting member is provided that extends outwardly from said frame and parallel thereto, said second hydraulic means is a second cylinder pivotally connected at the outer end thereof to the outer end portion of said supporting member, a second piston is slidably mounted in said second cylinder, and a piston rod is connected to said piston which extends through an opening in the inwardly disposed end of said second cylinder, with the inwardly disposed end of said piston rod being pivotally connected to said second jaw.

4. A tube gripping mechanism as defined by claim 2 wherein said first and second jaws are provided with registering means that automatically interlock when said second jaw is pivoted to a closed position with said first jaw.

5. A tube gripping mechanism as defined by claim 4 wherein said registering means is at least one protuberance extending from one of said jaws and a recess is formed in the other of said jaws of a size and configuration to snugly receive said protuberance when said first and second jaws are in the closed position.

6. A tube gripping mechanism as defined by claim 5 wherein said protuberance is sufficiently strong to withstand without damage the maximum longitudinally directed force that can be exerted on said second jaw member by said punch when said first piston is moved by said hydraulic fluid at the highest pressure used in said system.

7. A tube gripping mechanism as defined by claim 5 wherein said first and second locking members are sufficiently strong to withstand without damage the maximum radially directed force that can be exerted on said second jaw member by said punch when said first piston is moved by said hydraulic fluid at the highest pressure used in said system.

8. A tube gripping mechanism as defined by claim 5 wherein said punch and plunger each have longitudinally aligned bores formed therein of substantially the same interior diameter as that of said tubular member to permit an elongate mandrel of slightly smaller cross-section than that of said bores to be extended through said tubular member, punch and plunger when said flared end of said tubular member is being gripped between said punch and said dies.

References Cited in the file of this patent
UNITED STATES PATENTS

| | | |
|---|---|---|
| 2,649,283 | Lundeen | Aug. 18, 1953 |
| 2,707,876 | McConnell | May 10, 1955 |
| 2,784,626 | Paget | Mar. 12, 1957 |
| 2,823,450 | Thomas | Feb. 18, 1958 |